(12) United States Patent
Klose et al.

(10) Patent No.: US 9,948,508 B2
(45) Date of Patent: Apr. 17, 2018

(54) INHERENT POWER-OVER-DATA BUS SIGNALING FOR SECURE OPERATING MODE SWITCHING

(71) Applicant: Airbus Operations GmbH, Hamburg (DE)

(72) Inventors: Peter Klose, Hamburg (DE); Oliver Hanka, Munich (DE)

(73) Assignee: Airbus Operations GmbH (DE)

( * ) Notice: Subject to any disclaimer, the term of this patent is extended or adjusted under 35 U.S.C. 154(b) by 150 days.

(21) Appl. No.: 14/312,803

(22) Filed: Jun. 24, 2014

(65) Prior Publication Data

US 2014/0379880 A1 Dec. 25, 2014

(30) Foreign Application Priority Data

Jun. 25, 2013 (EP) .................................... 13173635

(51) Int. Cl.

| | | |
|---|---|---|
| *G06F 15/177* | (2006.01) | |
| *H04L 12/24* | (2006.01) | |
| *H04L 12/10* | (2006.01) | |
| *H04L 12/12* | (2006.01) | |
| *H04L 12/40* | (2006.01) | |
| *G05F 1/625* | (2006.01) | |

(52) U.S. Cl.
CPC .......... *H04L 41/0816* (2013.01); *G05F 1/625* (2013.01); *H04L 12/10* (2013.01); *H04L 12/12* (2013.01); *H04L 12/40039* (2013.01); *H04L 12/40045* (2013.01); *H04L 2012/4028* (2013.01); *Y02B 60/34* (2013.01)

(58) Field of Classification Search
CPC .. G05F 1/625; H04L 2012/4028; Y02B 60/34
See application file for complete search history.

(56) References Cited

U.S. PATENT DOCUMENTS

| | | | | |
|---|---|---|---|---|
| 6,380,769 B1 * | 4/2002 | Hall | .......................... | G06F 1/32 326/87 |
| 6,747,855 B2 * | 6/2004 | Kumar et al. | ................... | 361/18 |
| 7,885,222 B2 * | 2/2011 | Cole | ...................... | H04W 48/16 370/328 |
| 7,978,600 B2 * | 7/2011 | Itabashi | .............. | H04L 12/4135 370/229 |

(Continued)

FOREIGN PATENT DOCUMENTS

| | | |
|---|---|---|
| EP | 2 586 230 A2 | 5/2013 |
| WO | 2012/055300 A1 | 5/2012 |

OTHER PUBLICATIONS

European Search Report (EP 13173635.7) (dated Nov. 6, 2013).

*Primary Examiner* — Michael Y Won
(74) *Attorney, Agent, or Firm* — Lerner, David, Littenberg, Krumholz & Mentlik, LLP (57) ABSTRACT

A method for changing an operating mode of a processing unit of a network node is described. The processing unit is connected to a communication and supply line for providing data communication and for providing a supply voltage. The method includes an establishing of a communication connection of the processing unit of the network node via the communication and supply line, a determination of a change of the supply voltage of the communication and supply line by the processing unit, and a setting of an operation mode of the processing unit based on the determined change of the supply voltage.

12 Claims, 4 Drawing Sheets

(56) References Cited

U.S. PATENT DOCUMENTS

| | | | |
|---|---|---|---|
| 8,948,347 B2* | 2/2015 | Diegel | H04M 3/005 379/24 |
| 2002/0178083 A1* | 11/2002 | Cianciarulo | G06Q 10/10 709/217 |
| 2002/0178292 A1* | 11/2002 | Mushkin | H04B 3/54 709/248 |
| 2003/0085621 A1* | 5/2003 | Potega | B60L 11/185 307/18 |
| 2003/0122595 A1* | 7/2003 | Hall | G06F 1/32 327/112 |
| 2003/0221135 A1* | 11/2003 | Motoe | G06F 1/3209 713/300 |
| 2004/0024913 A1* | 2/2004 | Ikeda | H04B 3/54 709/249 |
| 2004/0034720 A1* | 2/2004 | Fujita | H04L 29/06 709/253 |
| 2004/0199803 A1* | 10/2004 | Suzuki | G06F 1/3203 713/400 |
| 2005/0099314 A1* | 5/2005 | Aisa | H02J 3/14 340/637 |
| 2006/0166706 A1 | 7/2006 | Dwelley et al. | |
| 2006/0248189 A1* | 11/2006 | Jerrard-Dunne | H04L 63/0209 709/225 |
| 2007/0001697 A1* | 1/2007 | Dobberpuhl et al. | 324/763 |
| 2007/0124462 A1* | 5/2007 | Yamanaka | G06F 3/1204 709/224 |
| 2007/0179633 A1* | 8/2007 | Ono et al. | 700/12 |
| 2007/0229054 A1* | 10/2007 | Dobberpuhl et al. | 324/76.11 |
| 2008/0224995 A1* | 9/2008 | Perkunder | 345/157 |
| 2009/0055517 A1* | 2/2009 | Kao | H04L 29/1232 709/221 |
| 2009/0154257 A1* | 6/2009 | Fujioka | G11C 7/1051 365/189.05 |
| 2009/0313486 A1* | 12/2009 | Tani | G06F 1/26 713/300 |
| 2010/0165721 A1* | 7/2010 | Shin | G11C 5/145 365/163 |
| 2011/0153766 A1* | 6/2011 | Ramchandani | H04L 41/0226 709/207 |
| 2011/0270456 A1* | 11/2011 | Kouda | H02J 13/0075 700/292 |
| 2012/0057435 A1* | 3/2012 | Honmura | G04C 10/02 368/76 |
| 2013/0109424 A1 | 5/2013 | Knefelkamp et al. | |
| 2013/0169235 A1* | 7/2013 | Patino | G01R 31/361 320/136 |
| 2013/0214759 A1 | 8/2013 | Chen et al. | |
| 2014/0379880 A1* | 12/2014 | Klose et al. | 709/221 |
| 2015/0095493 A1* | 4/2015 | Xu | H04B 3/542 709/225 |

* cited by examiner

INHERENT POWER-OVER-DATA BUS SIGNALING FOR SECURE OPERATING MODE SWITCHING

FIELD OF THE INVENTION

The invention relates to communication networks in means of transportation. In particular, the invention relates to a method for secure switching between operating modes of a network system. It is further related to a network node, a data network, and an aircraft comprising such a data network.

BACKGROUND OF THE INVENTION

Data networks in means of transportation may be used to provide communication services for a variety of data services. For example, a modern data network infrastructure within a means of transportation may be used by aircraft control systems, airline information and service systems, or passenger information and entertainment services. For proper and secure operation of such data networks it may be necessary to adapt and change configurations of network components or network nodes. Because such data networks may carry a variety of essential information and data, which may be critical for a safe operation of the aircraft, a high availability and reliable operation may be of particular importance. EP 2 586 230 A2 discloses a static mesh network in or for a cabin of a vehicle, in particular in or for an aircraft cabin, wherein the cabin has a predetermined, known cabin layout, comprising a plurality of network levels arranged hierarchically relative to one another. Due to their relevancy to aircraft safety and reliability, additional functional requirements on data networks in means of transportation may arise.

The change of a configuration of a network component may be seen as one important aspect related to safety and security of a data network in a means of transportation. Network components may normally be configured, for example, by sending special commands via the network data infrastructure to the devices. In order to achieve a secure operation of such systems, the administration or maintenance should therefore only be possible in certain operating modes. Therefore, the operating mode should be switchable, however, at the same time it should be ensured that an unintended switching of the operating mode, for example, from connected service domains, is prevented. Software commands via the network may be used to configure devices and change operating modes. Other solutions, which use additional encryption, may require higher effort, for instance, for key handling. Also local administration of the devices require access to the devices itself, which may be circumstantial, particularly, if the device is installed behind a panel. Other known solutions require a dedicated key line for the mode selection. However, this may require additional costly and weight-intensive cabling.

BRIEF SUMMARY OF THE INVENTION

An aspect of the invention improves safety and reliability of a data network within a means of transportation.

A method for changing an operating mode of a processing unit of a network node is proposed, wherein the processing unit is connected to a communication and supply line for providing data communication and for providing a supply voltage. The method comprises the following steps: a communication connection of the processing unit of the network node is established via the communication and supply line. Then, a change of the supply voltage of the communication and supply line is determined by the processing unit. Based on the determined change of the supply voltage, an operation mode of the processing unit is set.

An advantage of this method may be seen in a safe and secure way to enable or disable a configuration mode of a network component. In other words, an unintended switching into a maintenance or administration mode may be avoided. Another advantage may be seen in the use of existing hardware or existing infrastructure, since in many cases, a supply voltage is already provided on a communications cable to supply network components or network nodes within a data network. Therefore, additional installation of hardware components may not be necessary. This may further lower costs, weight, and installation effort.

The term "operating mode" may relate to a certain way, a network device responds to commands and/or a certain way of processing data. For example, a network processor may have a normal operating mode, where data is processed and/or forwarded according to the requirements of the connected services. In order to separate data processing functions and, for instance, configuration tasks, an additional defined configuration mode may be implemented, where the device responds to special configuration or administration instructions.

A "processing unit" may be seen as a network node logic, which may provide intelligent data processing, control of hardware components, and/or other additional functions. For example, a network node logic may be a microprocessor specialized for networking services. The processing unit may also be adapted to provide data switching for connecting the network node and the processing unit with other network nodes in a data network.

A "communication and supply line" may be electrical cable adapted to provide transportation of data, for instance, internet protocol packets, and additionally provides a possibility to carry a supply voltage for supplying connected network nodes. This combination of supply voltage and data communication capabilities in one physical line may provide advantages in terms of weight, cabling, and cost. For example, an Ethernet network often uses an eight-wire-cable, wherein four wires are used for data communication. The remaining unused wire may be utilized for transportation of a supply voltage to the destination network node. In other examples, also a two-wire-system may be possible, where a supply voltage and a data communication service are implemented on two wires of a communication and supply line.

Known solutions use the supply voltage only for supplying a supply voltage to network components, for instance 48 Volts direct voltage. An idea of the invention may be seen in a use of the supply voltage as a carrier of additional out-of-band information independently from the communications channel.

A change of the supply voltage may relate to a simple on-off-pattern, but may also relate to a concrete present value or value range of the supply voltage.

According to an embodiment, the setting of the operation mode of the processing unit at least comprises changing between a normal operation mode and a configuration mode.

An advantage may be seen in a logical separation of operating modes in order to avoid unintended configuration changes. Beyond a configuration mode and a normal operation mode, also further modes may be possible. The normal operation mode may relate to a typical function during a normal operation, for instance during a flight. In this case, a configuration should remain unchanged to ensure stable operation of the network node. A configuration mode may relate to a change of a configuration of a network node or processing unit, for instance, during maintenance of an aircraft on the ground.

According to an embodiment, the operation mode is set based on a determination of a predefined present voltage or voltage range of the supply voltage.

An advantage may be seen in a switching of the operating mode only in the case of a defined voltage change of the supply voltage. In other words, it may be prevented that, for instance, a configuration mode is enabled in case of accidental and unintended voltage changes. This may increase safety and reliability of an operation of the network node.

A "predefined present voltage" may relate to a measured current value of the supply voltage. A "voltage range" may relate to a specifically defined range of values of voltage, which may trigger a change of the operating mode.

The determination of the voltage value of the supply voltage may be, for instance, done via hardware in the network node or may also be provided externally, for instance, by external hardware or external applications.

According to an embodiment, the operation mode of the processing unit is set based on determination of a predefined timely change of the supply voltage.

An advantage may be seen in an increased security, because only in case that a certain pattern of voltage change is detected, the operation mode is switched. For instance, such a predefined timely change may be a certain number of on-off-cycles during a specific time (e.g. three times on and off during one second).

According to an embodiment, the operation mode is set based on a combination of the determined change of the supply voltage and a predefined set of data received by the processing unit via the communication connection.

An advantage may be seen in an increased security and a lower risk to falsely detect a triggering voltage change and the risk to initiate a false mode switching of the processing unit. In other words, only if a combination of two events occurs, the mode change is performed by the processing unit.

A "predefined set of data" may relate to, for instance, network configuration commands (e.g. SMTP commands) or other suitable data pattern on the communications channel of the network node and the communications and supply line.

According to an embodiment, the communication connection of the processing unit to the communication and supply line is established via a data switch of the network node.

A data switch may be, for instance, a fail-safe-switch of a network, arranged in a daisy-chain topology. A data switch may allow a proper functioning and continued data communication between neighboring network nodes in case of a failure of the network node or the processing unit. A data switch may be adapted to forward data packets within a network, for instance, an Ethernet-based network.

According to an embodiment, the supply voltage of the communication and supply line is provided to the data switch.

The advantage may be seen in a simpler provisioning of a supply current to the switch without the need of additional local or distributed power supply units. In other words, data communication and supply voltage may be provided with a single cable connection.

In one embodiment, the processing unit provides a further supply voltage to the data switch. An advantage may be seen in an additional redundant power supply in order to avoid a possible failure of the data switch due to, for example, a power outage of the supply voltage of the communication and supply line. This may increase reliability and robustness of an operation of the network node, particularly of the data switch to ensure a continued operation of other network components in the data network.

According to an embodiment, the method further comprises the step of connecting the data connection to a previous and a next network node by the data switch. Furthermore, the step of detecting a failure of the processing unit by the data switch is included. Also, the data connection between the previous and the next network node in case of a failure of the processing unit is short-circuited.

An advantage may be seen in a fail-safe function of the network node, such that in case of a node outage or node failure, a data communication between a previous and a next network node is maintained. Particularly in a daisy-chain topology of a data network such a short-circuiting may be essential to ensure continued data communication between other network nodes within a data network.

According to an embodiment, the method further comprises the step of exchanging, by an interface of the processing unit, data with application data services.

An advantage may be seen in the possibility to connect a variety of different data services, such as aircraft control services, airline information and services, and passenger information and entertainment services. These data service domains may commonly use the data communication infrastructure of the data network and/or may access the network through the interface of the processing unit.

According to an embodiment, the method further comprises the step of changing the supply voltage by a central server unit, which is connected to the communication and supply line.

An advantage may be seen in a possibility to have a centralized control and/or data handling, which may simplify a management and configuration of the data network. In addition, the server may initiate a mode change triggering a voltage change on the supply voltage by controlling the power supply associated with the server. The provided supply voltage may be combined into a single communication and supply line along with the data channels. Furthermore, the server unit may send additional predefined sets of data, for instance to identify a specific network node, or for commanding the setting of the configuration mode. In other words, the server unit may be configured to provide a combination of a predefined voltage change and a predefined data pattern or command to trigger a change of the operation mode of the processing unit of the connected network node.

In an aspect of the invention, a network node for a data network is provided, which comprises a processing unit, and a sensor for measuring a voltage of a supply voltage in a communication and supply line connected to the processing unit. The network node is supplied with the supply voltage from the communication and supply line. The processing unit is adapted to establish a communication connection of a processing unit of the network node via the communication and supply line. The processing unit is adapted to determine a change of the central supply voltage of a communication and supply line with the sensor. The processing unit is furthermore adapted to set an operation mode of the processing unit as a function of the state of the supply voltage.

The term "sensor" may relate to hardware or software means, which may detect a voltage, for instance in a multi-wire cable. In one example, the sensor is arranged outside the network node, for instance as part of an external network component.

In an aspect of the invention, a data network is proposed, which comprises a central server unit, a network node as described above, and a communication and supply line, which is adapted to provide data communication between the central server unit and the network node and to supply a supply voltage from the central server unit.

In an embodiment of the data network, the central server unit comprises a central power supply adapted to provide the supply voltage to the communication and supply line. Furthermore, the central server unit comprises a switch for changing the supply voltage supplied to the network node, which may mean generation of on-off pattern, but also changing a voltage value within certain limits.

In a further aspect of the invention, an aircraft is proposed, which comprises a data network as described above. In particular, the means of transportation may be an aircraft, for example, an airplane.

It has to be understood that features of the method as described in the above and in the following may be features of the network node, the data network, or the aircraft, as described in the above and in the following. If technically possible but not explicitly mentioned, also combinations of embodiments of the invention described in the above and in the following may be embodiments of the method, the network node, the data network, and the aircraft.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
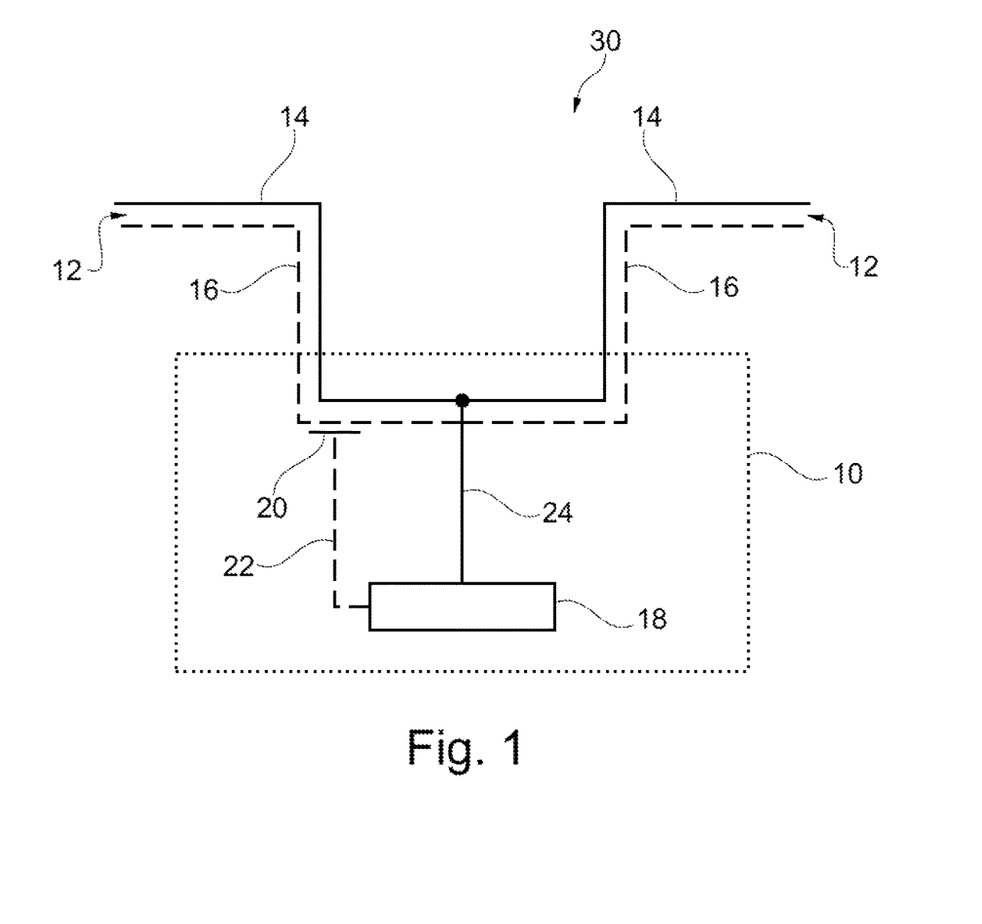
FIG. 1 schematically shows a network node with a communication and supply line according to an embodiment of the invention.

FIG. 1 shows an example of a network node 10 with a communication and supply line 12 as part of a data network 30. The communication and supply line 12 provides a data communication channel 14 and a supply voltage 16. The communication and supply line 12 may be, for instance, connected with one end to a previous network node and with another end to a next or following network node. The communication and supply line 12 is connected with the network node 10, which comprises a processing unit 18, a sensor 20, a sensor connection 22, and a data connection 24. The sensor 20 is adapted for measuring a voltage in the supply voltage 16 in the communication and supply line 12. The sensor 20 does not necessarily require a direct electric connection with the supply voltage 16, but may use other principles like electromagnetic or capacitive effects. The information provided by the sensor 20 is received by the processing unit 18 through the sensor connection 22.

The data connection 24 allows the processing unit 18 to communicate with the data communication channel 14 of the communication and supply line 12. The processing unit 18 detects a change of the supply voltage 16 by the sensor 20 and may, depending on the determined change of the supply voltage 16, set an operation mode of the processing unit 18. In the shown example, the data communication channel 14 may, for instance, be an Ethernet-based data network channel. The communication and supply line 12 may integrate the data communication channel 14 and the supply voltage 16 within a common set of wires and one physical cable.

In an example, the supply voltage 16 is switched off for enabling a configuration mode of the processing unit 18. In this case, the sensor 20 detects this change and provides this information via the sensor connection 22 to the processing unit 18. Based on this detected change of the supply voltage 16, the processing unit switches to a configuration mode.

Figure 2:
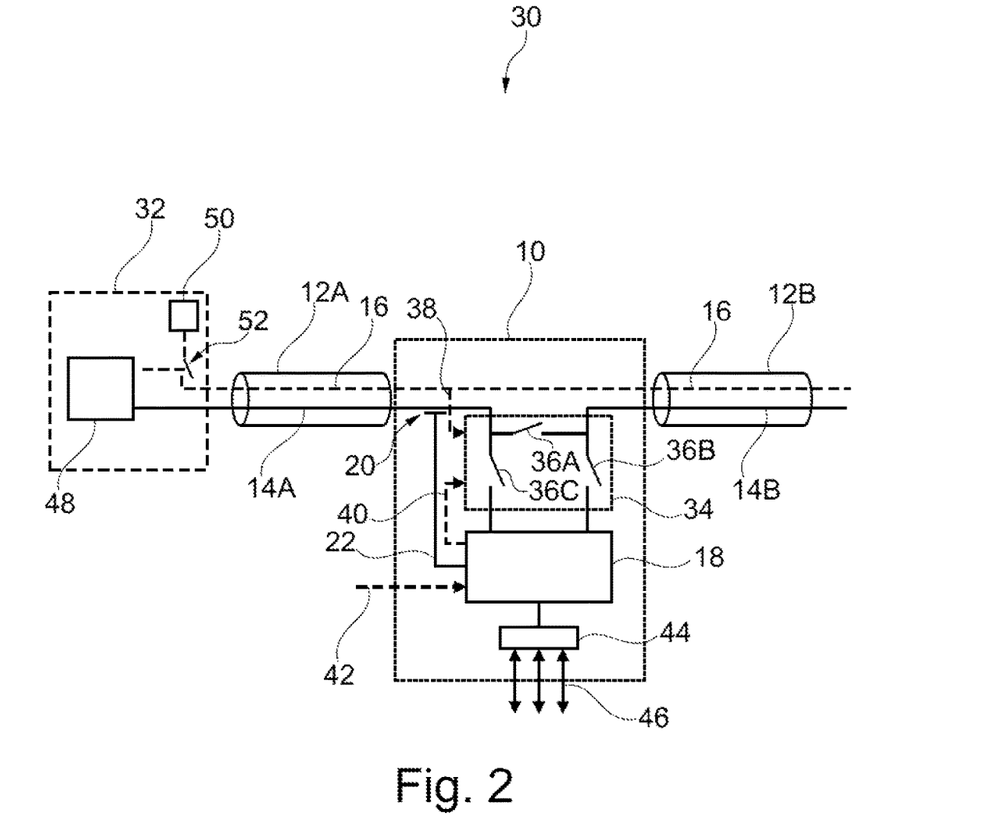
FIG. 2 shows a schematic overview of an example of a data network according to an embodiment of the invention.

In FIG. 2, a schematic overview of an example of a data network 30 is shown. The data network 30 comprises a network node 10 with a processing unit 18, a sensor 20, and a sensor connection 22, which allows the processing unit 18 to receive sensor signals from the sensor 20.

The network node 10 is connected to a first communication and supply line 12A, and is furthermore connected to a second communication and supply line 12B. Both supply lines 12A, 12B provide a supply voltage 16. The first communication and supply line 12A comprises a first data communication channel 14A, which provides a data connection between the network node 10 and a server unit 32. The second communication and supply line 12B comprises a second data communication channel 14B for providing data communication to a following network node.

The network node 10 further comprises a data switch 34 with switching elements 36A, 36B, 36C. The data switch 34 may be operated as fail-safe switch, which connects the first data communication channel 14A with the second data communication channel 14B, and, furthermore, connects both data communication channels 14A, 14B to the processing unit 18.

The data switch is adapted to detect a failure of the processing unit 18 and may directly connect the first data communication channel 14A to the second data communication channel 14B, establishing a direct data connection between the two data communication channels 14A, 14B. This may allow a continued data transmission on the data communication channel 14A, 14B, even in the case of a failure of the network node 10, in particular the processing unit 18. In this case, the switching element 36A short-circuits or bridges both data communication channels 14A, 14B. In addition, in case of a failure of the processing unit 18, the data communication channel 14A to the processing unit 18 may be interrupted by the switching element 36C. Analogously, the connection of the second data communication channel 14B to the processing unit 18 is interrupted or opened by the switching element 36B, for example, in case of a failure of the processing unit 18. The fail-safe data switch 34 may be used in a daisy-chain network topology, as shown in the current example. However, also other network topologies and technologies, such as Ethernet, Token Ring, and others may be used.

The fail-safe data switch 34 has a connection for supply voltage 38 to the supply voltage 16 of the communication and supply line 12. This allows operating the data switch 34 without a local power supply. In addition, the fail-safe data switch 34 is powered by a further supply voltage 40 from the processing unit 18. In combination with the connection for supply voltage 38, the further supply voltage may provide a redundant and reliable power supply of the data switch 34. Furthermore, in case of voltage changes or voltage variations of the supply voltage 16, the data switch 34 may still be safely operated with the supply voltage 40 provided by the processing unit 18. The processing unit 18 is operated with a processing unit supply voltage 42, which may be provided, for instance, by a local power supply at or in the network node 10.

The processing unit 18 is connected to an interface 44 for connecting application data services 46. Such application data services 46 may be, for instance, data domains or service domains for aircraft control services, a variety of passenger services, or other aircraft-related information services.

In an example, the interface and/or the processing unit are adapted to prevent application data services 46 from changing an operating mode of the processing unit 18, which may improve security and reliability of the data network 30.

The server unit 32 comprises a server processing unit, which is connected to the first data communication channel 14A. The server unit 32 further comprises a server power supply 50, which is, via a server supply voltage switch 52, connected to the supply voltage 16 of the communication and supply line 12A. The server processing unit 48 is adapted to control the server supply voltage switch 52 and may therefore change the supply voltage 16 of the communication and supply lines 12A, 12B.

In one example, for changing an operating mode of the processing unit 18, the server processing unit 48 switches the supply voltage 16 off via the server supply voltage switch 52. The processing unit 18 detects, via the sensor 20 and the sensor connection 22, the change of supply voltage 16 and switches the operation mode of the processing unit 18 to a configuration mode.

In an example, the operation mode of the processing unit 18 is changed based on a combination of a change of the supply voltage 16, sensed by the sensor 20, and a predefined set of data received by the processing unit 18 through the first or second data communication channel 14A, 14B. In other words, only if both a change in supply voltage 16 and a certain predefined set of data are received, the change of the configuration mode of the processing unit 18 is initiated.

In an example, specific network nodes 10 of a plurality of network nodes 10 may be addressed specifically by assigning certain sets of data to a specific network node 10.

In an example, the server unit enables a configuration mode for all network nodes 10 and all processing units 18 of a data network 30.

Figure 3:
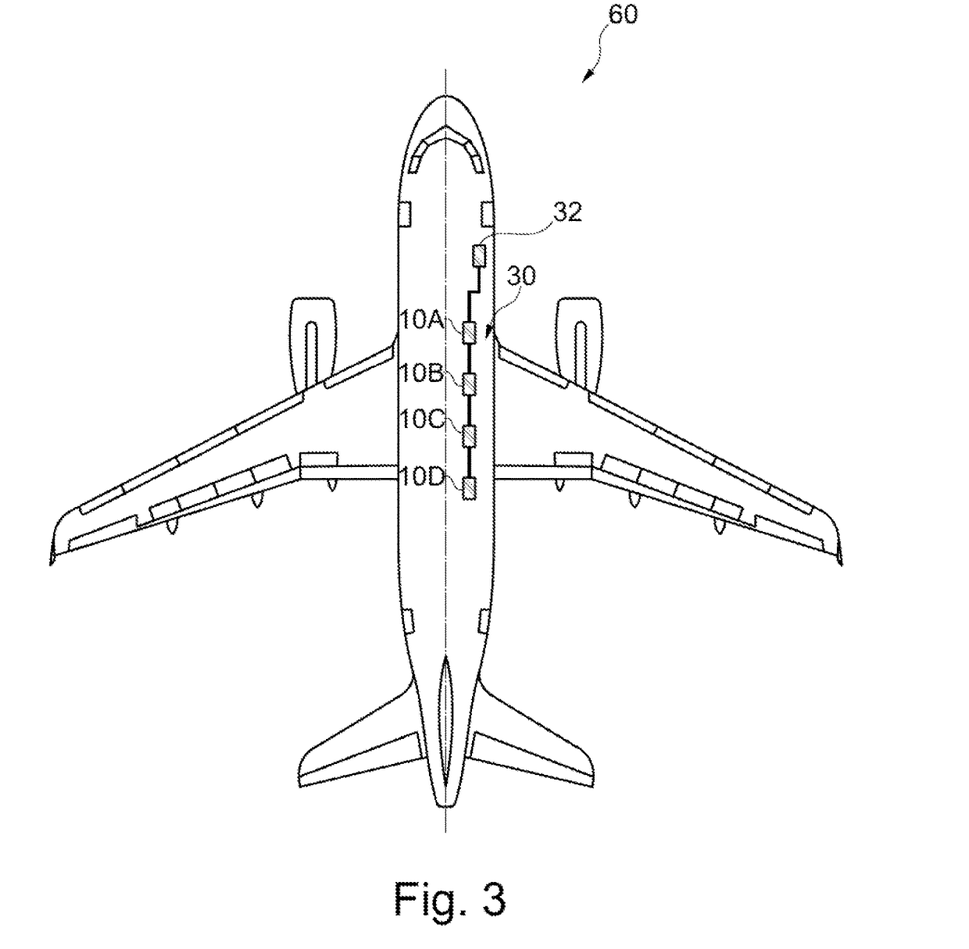
FIG. 3 shows an aircraft with a data network with network nodes according to an embodiment of the invention.

FIG. 3 shows an aircraft 60, comprising a data network 30 with network nodes 10A, 10B, 10C, and 10D. The network nodes 10A, 10B, 10C, 10D are arranged in an inner area of the aircraft 60. Additionally, a server unit 32 is connected to the network nodes 10A, 10B, 10C, 10D. The data network 30 is arranged in a daisy-chain topology, which means that the network components are arranged and logically connected to each other in a serial manner. However, also any other network technology or network topology may be used. Each network node 10A, 10B, 10C, 10D may be further connected to application data services (not shown), providing specific aircraft or passenger data services.

Figure 4:
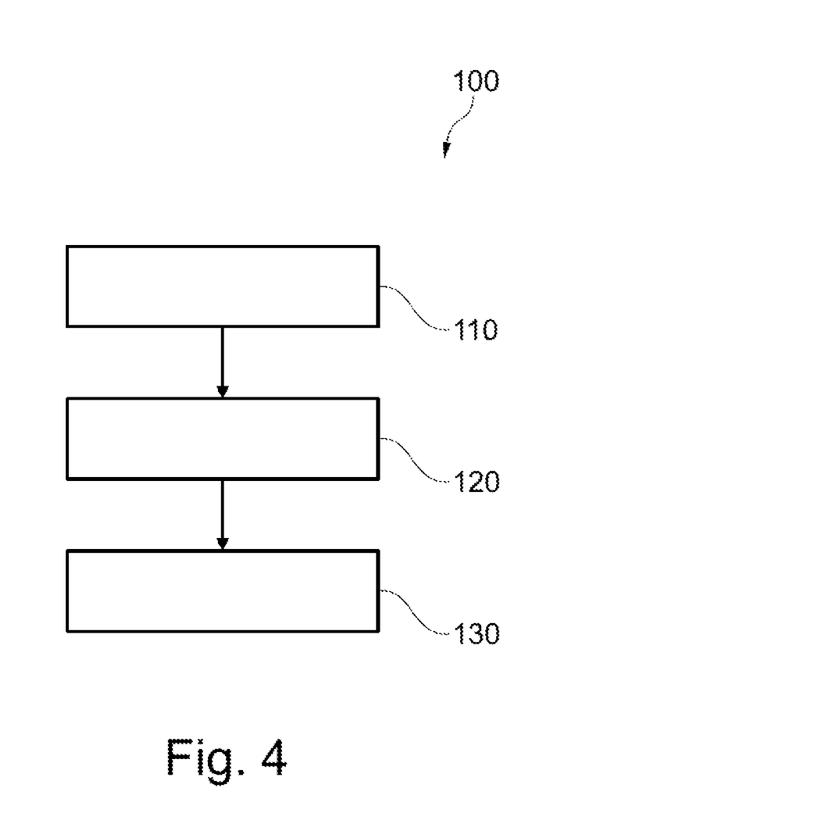
FIG. 4 shows an example of a method for changing an operating mode of a processing unit according to an embodiment of the invention.

In FIG. 4, an example of a method for changing an operating mode of a processing unit of a network node is schematically shown. The processing unit is connected to a communication and supply line for providing data communication and for providing a supply voltage. In a first step 110, a communication connection of the processing unit of the network node is established via the communication and supply line. In a second step 120, a change of the supply voltage of the communication and supply line is determined by the processing unit. Based on a determined change of the supply voltage in step 130, an operation mode of the processing unit is set. For example, an operation mode may be, for instance, a normal operation mode, or a configuration mode of the processing unit.

The functional modules may be implemented as programmed software modules or procedures, respectively. However, one skilled in the art will understand that the functional modules may be implemented fully or partially in hardware.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller, or unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

LIST OF REFERENCE SIGNS 10 network node
12 communication and supply line
12A first communication and supply line
12B second communication and supply line
14 data communication channel
14A first data communication channel
14B first data communication channel
16 supply voltage
18 processing unit
20 sensor
22 sensor connection
24 data connection
30 data network
32 server unit
34 data switch
36 switching elements
38 connection for supply voltage
40 further supply voltage
42 processing unit supply voltage
44 interface
46 application data services
48 server processing unit
50 server power supply
52 server supply voltage switch
60 aircraft

The invention claimed is:
1. A method for changing an operating mode of a processing unit of a data network node for an aircraft, connected to a data communication and power supply line for providing data communication and for providing a supply voltage, the method comprising:

establishing a data communication connection of the processing unit of the data network node to another data network node or a server unit via the data communication and supply line wherein the data communication connection of the processing unit to the data communication and supply line is established via a data switch of the data network node;

determining a change of the supply voltage of the data communication and power supply line by the processing unit;

setting an operation mode of the processing unit based on the determined change of the power supply voltage; and exchanging, by an interface of the processing unit, data with application data services, wherein the setting of the operation mode of the processing unit comprises at least changing between a normal operation mode and a configuration mode, wherein the change between the normal operation mode and the configuration mode is set by triggering a change in voltage on the power supply line, wherein, in the normal operating mode, data is processed and/or forwarded according to requirements of connected services, and wherein, in the configuration mode, the device responds to configuration or administration instructions.

2. The method according to claim 1,
wherein the operation mode is set based on a determination of a predefined present voltage or voltage range of the supply voltage.

3. The method according to claim 1,
wherein the operation mode of the processing unit is set based on determination of a predefined timely change of the supply voltage.

4. The method according to claim 1,
wherein the operation mode is set based on a combination of the determined change of the supply voltage and a predefined set of data received by the processing unit via the communication connection.

5. The method according to claim 1,
wherein the supply voltage of the data communication and power supply line is provided to the data switch.

6. The method according to claim 1,
wherein the processing unit provides a further supply voltage to the data switch.

7. The method according to claim 1, further comprising:
connecting the data connection to a previous and a next data network node by the data switch;
detecting a failure of the processing unit by the data switch; and
short-circuiting the data connection between the previous and the next data network node in case of a failure of the processing unit.

8. The method according to claim 1, further comprising:
changing the supply voltage by a central server unit, which is connected to the data communication and supply line.

9. The method of claim 1, wherein the change of the supply voltage includes switching off the supply voltage.

10. A data network node for an aircraft data network, comprising
a processing unit;
a sensor for measuring a voltage in a supply voltage in a data communication and power supply line connected to the processing unit;
wherein the data network node is supplied with the supply voltage from the data communication and power supply line;
wherein the processing unit is adapted to establishing a communication connection of a processing unit of the data network node via the data communication and power supply line;
wherein the processing unit is adapted to determine a change of the central supply voltage of a data communication and power supply line with the sensor;
wherein the processing unit is adapted to set an operation mode of the processing unit as a function of the state of the supply voltage,
wherein the processing unit is adapted to exchange, by an interface of the processing unit, data with application data services,
wherein the setting of the operation mode of the processing unit comprises at least changing between a normal operation mode and a configuration mode,
wherein the setting of the normal operation mode and the configuration mode is triggered by changing a voltage on the supply voltage,
wherein, in the normal operating mode, data is processed and/or forwarded according to requirements of connected services, and
wherein, in the configuration mode, the device responds to configuration or administration instructions.

11. An aircraft data network, comprising
a central server unit;
a data network node comprising:
a processing unit;
a sensor for measuring a voltage in a supply voltage in a communication and supply line connected to the processing unit;
wherein the data network node is supplied with the supply voltage from the supply and communication line;
wherein the processing unit is adapted to establishing a communication connection of a processing unit of the data network node via the communication and supply line;
wherein the communication connection of the processing unit to the communication and supply line is established via a data switch of the data network node;
wherein the processing unit is adapted to determine a change of the central supply voltage of a data communication and power supply line with the sensor;
wherein the processing unit is adapted to set an operation mode of the processing unit as a function of the state of the supply voltage,
wherein the processing unit is adapted to exchange, by an interface of the processing unit, data with application data services, and
a communication and supply line adapted to provide data communication between the central server unit and the data network node and to supply a supply voltage from the central server unit,
wherein the setting of the operation mode of the processing unit comprises at least changing between a normal operation mode and a configuration mode,
wherein the change between the normal operation mode and the configuration mode is set by triggering a change in voltage on the power supply line, wherein, in the normal operating mode data is processed and/or forwarded according to requirements of connected services, and wherein, in the configuration mode, the device responds to configuration or administration instructions.

12. The aircraft data network of claim 11, wherein the central server unit comprises a server power supply adapted to provide the supply voltage to the data communication and power supply line;

wherein the central server unit comprises a server supply voltage switch for changing the supply voltage supplied to the data network node.

* * * * *